United States Patent
Kim

(10) Patent No.: US 8,243,209 B2
(45) Date of Patent: Aug. 14, 2012

(54) WIRELESS TRANSMITTER, WIRELESS TELEVISION SYSTEM, AND CONTROLLING METHOD THEREOF

(75) Inventor: Sang Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1140 days.

(21) Appl. No.: 12/092,393

(22) PCT Filed: Oct. 23, 2006

(86) PCT No.: PCT/KR2006/004331
§ 371 (c)(1),
(2), (4) Date: May 1, 2008

(87) PCT Pub. No.: WO2007/066892
PCT Pub. Date: Jun. 14, 2007

(65) Prior Publication Data
US 2008/0256587 A1 Oct. 16, 2008

(30) Foreign Application Priority Data
Nov. 2, 2005 (KR) .......................... 10-2005-0104180

(51) Int. Cl.
*H04N 5/38* (2006.01)
*H04N 5/66* (2006.01)
(52) U.S. Cl. ........................................ 348/739; 348/723
(58) Field of Classification Search .................. 348/739, 348/723, 730, 839, 553, 734, 838, 836; 725/81; 345/156
See application file for complete search history.

(56) References Cited

U.S. PATENT DOCUMENTS

| 4,905,080 | A | * | 2/1990 | Watanabe et al. ............... 725/14 |
| 5,017,837 | A | | 5/1991 | Hanna et al. |
| 5,731,763 | A | * | 3/1998 | Herweck et al. ........... 340/12.55 |
| 6,263,503 | B1 | | 7/2001 | Margulis |
| 6,791,276 | B2 | | 9/2004 | Li |
| 6,930,681 | B2 | | 8/2005 | Raskar et al. |
| 7,124,313 | B1 | * | 10/2006 | Motohashi .................... 713/324 |
| 7,132,956 | B2 | * | 11/2006 | Haruki ........................ 340/12.53 |
| 7,636,132 | B2 | * | 12/2009 | Sakamoto ..................... 348/723 |
| 2002/0071062 | A1 | * | 6/2002 | Liu ............................... 348/838 |
| 2002/0186325 | A1 | * | 12/2002 | Mears et al. .................. 348/730 |
| 2005/0110808 | A1 | * | 5/2005 | Goldschmidt et al. ........ 345/690 |
| 2005/0219427 | A1 | * | 10/2005 | Akazawa ...................... 348/839 |
| 2006/0058018 | A1 | * | 3/2006 | Toulis et al. ............... 455/422.1 |

* cited by examiner

*Primary Examiner* — Victor Kostak
(74) *Attorney, Agent, or Firm* — Birch, Stewart, Kolasch & Birch, LLP

(57) ABSTRACT

Provided are a wireless television system and a wireless transmitter, capable of automatically turning off a light-emitting unit installed in the wireless transmitter depending on a power state of the wireless transmitter and the wireless television system. The wireless television system includes: a wireless transmitter for relaying a video signal received from the outside; a wireless television for receiving the video signal from the wireless transmitter and displaying an image corresponding to the received composite video signal; a light-emitting unit installed in at least one of the wireless transmitter and the wireless television, and displaying one of a power state and a signal transmission/reception state from one of the wireless transmitter and the wireless television; and a light-emission control unit for controlling the light-emitting unit to emit light when both power of the wireless transmitter and power the wireless television are turned on.

19 Claims, 3 Drawing Sheets

[Fig. 1]
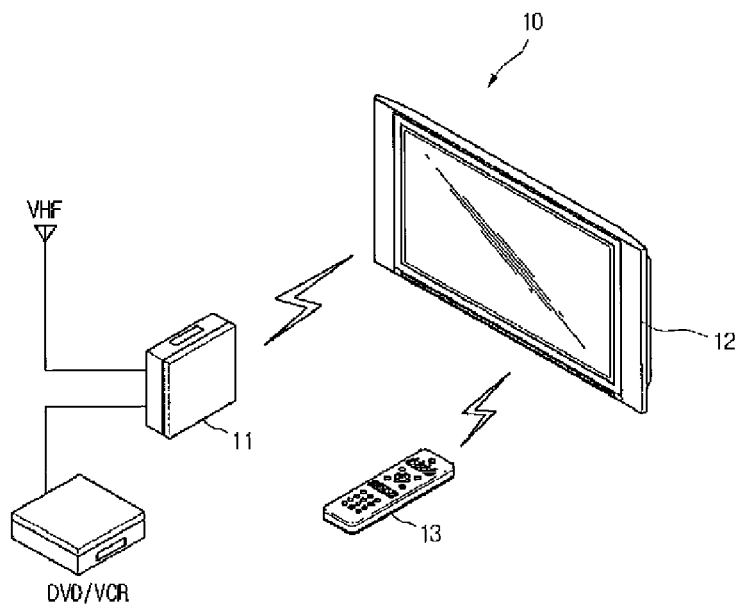
[Fig. 2]
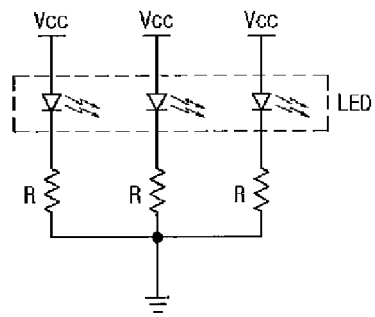
[Fig. 3]
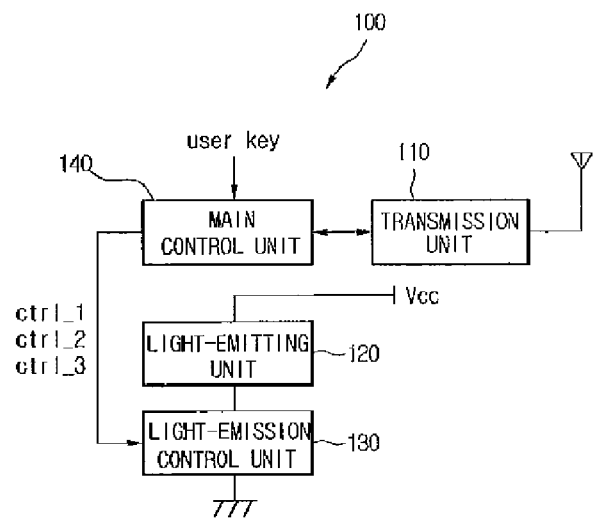

[Fig. 4]
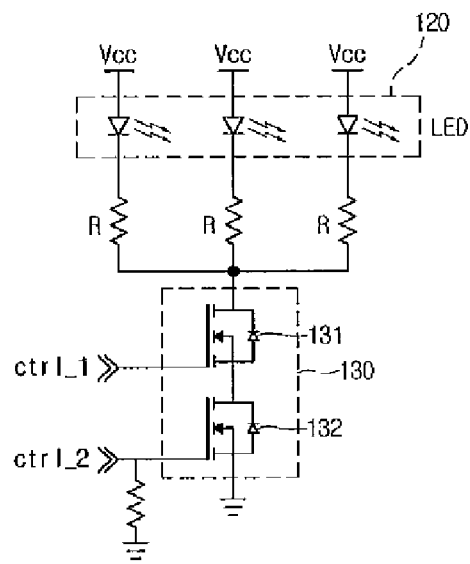
[Fig. 5]
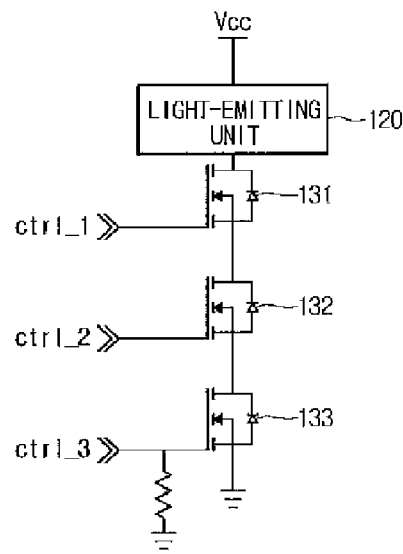
[Fig. 6]
|   | Ctrl_1 | Ctrl_2 | LED |
|---|--------|--------|-----|
| 1 | Low    | Low    | off |
| 2 | Low    | High   | off |
| 3 | High   | Low    | off |
| 4 | High   | High   | on  |

[Fig. 7]
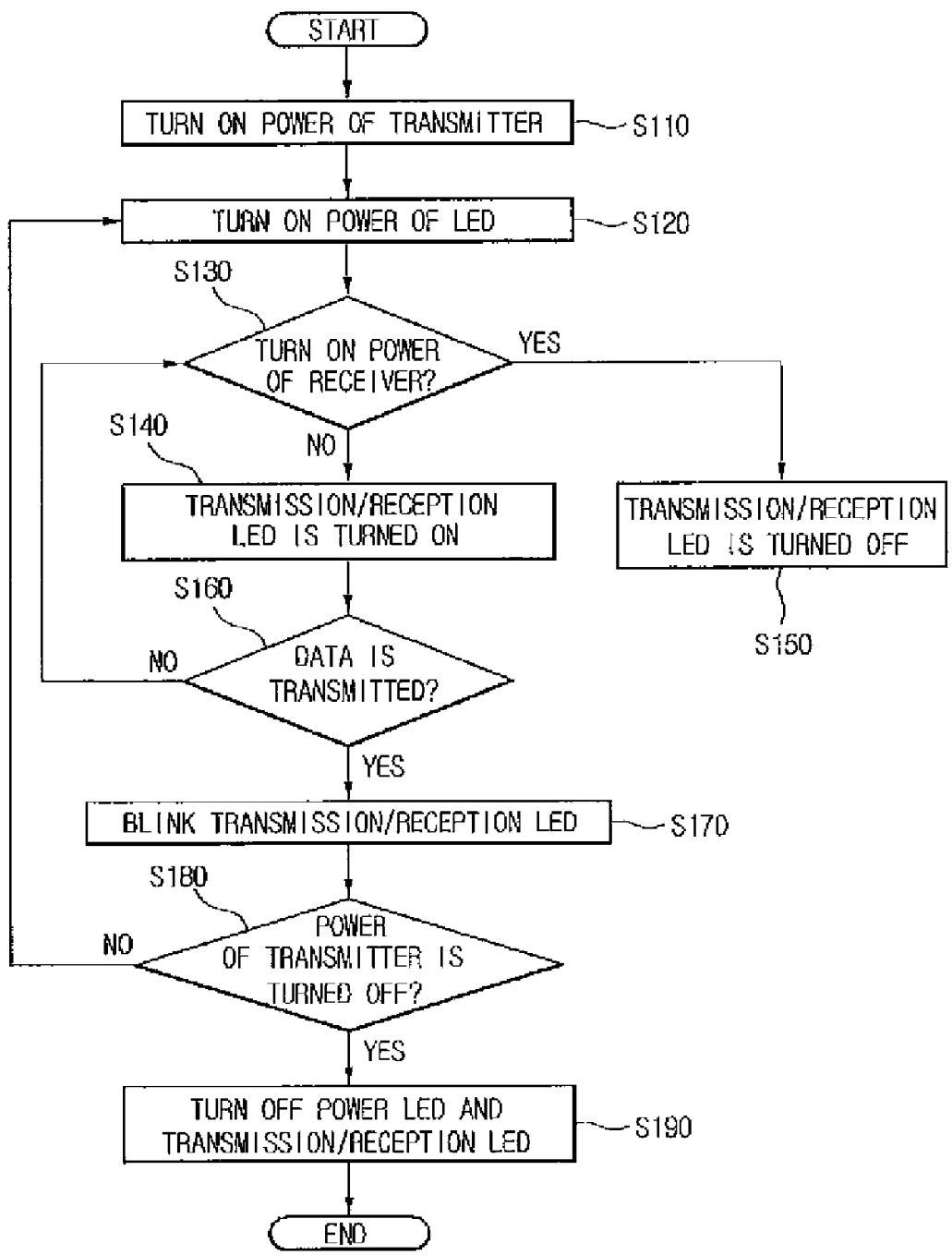

WIRELESS TRANSMITTER, WIRELESS TELEVISION SYSTEM, AND CONTROLLING METHOD THEREOF

TECHNICAL FIELD

The present invention relates to a wireless television system and a wireless transmitter, and more particularly, to a wireless television system and a wireless transmitter, capable of automatically turning off a light-emission part installed in the wireless transmitter depending on a power state of the wireless transmitter and the wireless television system.

BACKGROUND ART

Generally, since a wireless communication system does not use a cable, there is no installation limitation in an aspect of geopolitics. Therefore, since extension or change of a line is not required even when a location of a terminal is changed or a terminal is added/deleted, manpower and economic costs can be remarkably reduced in comparison with wired communication. Accordingly, activities for realizing wireless communication environments using light (e.g., an infrared) instead of wired communication are under development.

Under this circumstance, a television apparatus allowing television viewing using a related art wired cable is also adapted to allow television viewing wirelessly. This wireless television system will be described with reference to FIGS. 1 and 2.

FIG. 1 is a schematic view illustrating a general wireless television system, and FIG. 2 is a circuit diagram illustrating a light-emitting unit provided to a related art wireless television system.

Referring to FIGS. 1 and 2, the wireless television system 10 can include a wireless transmitter 11, a wireless television 12, and a remote controller 13. The wireless transmitter 11 transmits video signals input from a broadcast signal input port, a digital versatile disk (DVD)/video cassette recorder (VCR) signal input port, or an S-video signal input port to the wireless television 12. The wireless television 12 receives video signals from the wireless transmitter 11 and displays an image corresponding to the video signals. Also, the remote controller 13 is a means for inputting a user's instruction.

The wireless transmitter 11 and the wireless television can include a light-emitting unit for displaying a power state and a signal transmission/reception state. The light-emission can include light-emitting devices (LEDs) emitting light when powers of the wireless transmitter 11 and the wireless television 12 are turned on.

The light-emitting unit provided to the wireless transmitter 11 of the wireless television system 10 will be described with reference to FIG. 2.

Referring to FIG. 2, the light-emitting unit provided to the wireless transmitter 11 can include at least one LED. A predetermined drive power Vcc is applied to one electrode of the LED. Also, a ground voltage can be applied to the other electrode of the LED. Therefore, when power of the wireless transmitter 11 is an on-state, the drive power Vcc is applied to the light-emitting unit, and a current path is formed by the drive power Vcc, the LED, and the ground voltage, so that the light-emitting unit emits light.

However, the LED installed in the wireless transmitter 11 continues to maintain a light-emitting state even when power of the wireless television 12 is set to an off-state and a user does not watch the television 12. That is, the LED provided to the wireless transmitter 11 keeps emitting light as far as power is constantly supplied to the wireless transmitter itself even when the user does not watch the television. In this case, power is unnecessarily consumed by the LED, and dazzling is generated to the user at night, which causes inconvenience.

Further, this problem becomes serious even more when the number of LEDs in use increases for easy checking of the LEDs by a user and elegant appearance.

DISCLOSURE OF INVENTION

Technical Problem

An object of the present invention is to provide a wireless transmitter, a wireless television system and a controlling method thereof, capable of preventing unnecessary power consumption by automatically turning off a light-emitting unit installed in the wireless transmitter depending on a power state of the wireless transmitter and the wireless television.

Technical Solution

To achieve these and other advantages and in accordance with the purpose of the present invention, as embodied and broadly described, there is provided a wireless television system including: a wireless transmitter for relaying a video signal received from the outside; a wireless television for receiving the video signal from the wireless transmitter and displaying an image corresponding to the received composite video signal; a light-emitting unit installed in at least one of the wireless transmitter and the wireless television, and displaying one of a power state and a signal transmission/reception state from one of the wireless transmitter and the wireless television; and a light-emission control unit for controlling the light-emitting unit to emit light when both power of the wireless transmitter and power of the wireless television are turned on.

In another aspect of the present invention, there is provided a wireless transmitter for relaying video signals received from the outside, the wireless transmitter including: a transmission unit for transmitting the video signals to a wireless television wirelessly; a light-emitting unit for displaying one of a power state of the wireless transmitter and a signal transmission state of the transmission unit; and a light-emission control unit for controlling the light-emitting unit to emit light when both power of the wireless transmitter and power of the wireless television are turned on.

In still another aspect of the present invention, there is provided a method for controlling a wireless television system, the method including: providing power to at least one of a wireless transmitter and a wireless television; detecting power providing states of the wireless transmitter and the wireless television; generating at least one control signal for controlling a light-emitting unit for displaying one of a power state and a signal transmission state of the wireless transmitter depending on the detection results; and when both power of the wireless transmitter and power of the wireless television are turned on in response to the control signal, controlling the light-emitting unit to emit light.

Advantageous Effects

According to a wireless transmitter having a transmission/reception light-emitting unit that is automatically turned off, a wireless television system and a controlling method thereof, the light-emitting unit installed in the wireless transmitter can be automatically turned off depending on power states of the wireless transmitter and the wireless television, so that unnecessary power consumption can be prevented and a problem dazzling of a user caused by light emission of LEDs at night can be solved.

BRIEF DESCRIPTION OF THE DRAWINGS

FIG. 1 is a schematic view illustrating a general wireless television system;

FIG. 2 is a circuit diagram illustrating a light-emitting unit provided to a related art wireless television system;

FIG. 3 is a block diagram illustrating a wireless transmitter of a wireless television system according to the present invention;

FIG. 4 is a circuit diagram illustrating a light-emitting unit and a light-emission control unit of the wireless transmitter of FIG. 3;

FIG. 5 is a circuit diagram of the light-emission control unit of FIG. 4 according to another embodiment of the present invention;

FIG. 6 is a table illustrating an operating condition of the light-emitting unit illustrated in FIG. 4; and FIG. 7 is a flowchart illustrating a method for controlling a wireless television system according to the present invention.

BEST MODE FOR CARRYING OUT THE INVENTION

Reference will now be made in detail to the preferred embodiments of the present invention, examples of which are illustrated in the accompanying drawings.

FIG. 3 is a block diagram illustrating a wireless transmitter of a wireless television system according to the present invention. Referring to FIG. 3, the wireless television system includes a wireless transmitter 100 for transmitting video signals from the outside to a wireless television.

The wireless transmitter 100 can include a transmission unit 110 for transmitting video signals from the outside to the wireless television, and a light-emitting unit 120 for displaying power on/off state of the wireless transmission unit 100, or a signal transmission/reception state between the transmission unit 110 and the wireless television. Also, the wireless transmitter 100 can further include a light-emission control unit 130 for controlling an operation of the light-emitting unit 120, and a main control unit 140 for controlling various function blocks of the wireless transmitter 100.

The main control unit 140 outputs light-emission control signals ctrl_1, ctrl_2, and ctrl_3 for controlling the light-emitting unit 120 to a light-emission control unit 130 when a power-on signal is input to the wireless transmitter 100 or a signal reception loop is formed between the transmission unit 110 and the wireless television.

The first light-emission control signal ctrl_1 may be activated when power of the wireless transmitter 100 is turned on by a user manipulating a remote controller. The second light-emission control signal ctrl_2 may be activated when both power of the wireless transmitter 100 and power of the wireless television are turned on, a signal transmission/reception loop is formed, and a loop back flag is detected. Also, the third light-emission control signal ctrl_3 may be a signal for blinking the light-emitting unit 120 when a data signal is transmitted and received between the transmission unit 110 and the wireless television. As the light-emitting unit 120 blinks during actual transmission/reception of data, a user can judge the wireless transmitter 100 operates normally.

Though not shown, the light-emitting unit 120 can include at least one light-emitting diode (LED) and can be connected to a predetermined drive power source Vcc. The LED emits light when a current path is formed and a current flows through the LED. For a preferred embodiment for controlling light emission of the LED, it is possible to control light-emission of the LED by cutting off a path of a current flowing through the LED under control of the light-emission control unit 130.

Operations of the light-emitting unit 120 and the light-emission control unit 130 will be described in detail with reference to FIG. 4.

FIG. 4 is a circuit diagram illustrating a light-emitting unit and a light-emission control unit of the wireless transmitter of FIG. 3. Referring to FIG. 4, the light-emitting unit 120 can include at least one LED, and the at least one LED can be connected between the predetermined drive power source Vcc and a resistor.

Meanwhile, the light-emission control unit 130 can include at least one switching device. For example, the light-emission control unit 130 includes two switches. A first switch 131 and a second switch 132 can be connected between the light-emitting unit 120 and a ground voltage. In realizing the switch, a metal oxide semiconductor field effect transistor (MOSFET) can be used for the switch so that integrated circuit (IC) can be easily realized.

The first switch 131 is switched in response to the first control signal ctrl_1. As described above, the first control signal ctrl_1 is activated when power of the wireless transmitter 100 is turned on by the user manipulating the remote controller. Also, the second switch 132 is switched in response to the second control signal ctrl_2. As described above, the second control signal ctrl_2 is activated when both power of the wireless transmitter 100 and power of the wireless television are turned on, a signal transmission/reception loop is formed.

The first and second switches 131 and 132 may be series-connected between the light-emitting unit 120 and the ground voltage. Accordingly, power of the wireless television 100 is turned off and the signal transmission/reception loop is not formed even when the wireless transmitter 100 is turned on. In this case, the second switch 132 is turned off. Therefore, a path of a current flowing through the light-emitting unit 120 is blocked, so that the LED provided to the light-emitting unit 120 can be turned off.

Also, the LED emits light only when both power of the wireless transmitter 100 and power of the wireless television are turned on. That is, when a power-on signal of the wireless transmitter 100 is input, the first control signal ctrl_1 is activated to turn on the first switch 131. Also, when both power of the wireless transmitter 100 and power of the wireless television are turned on, the signal transmission/reception loop is formed, so that the second control signal ctrl_2 is activated. The second switch 132 is turned on in response to the second control signal ctrl_2. Accordingly, a current path is formed by a drive power source, the LED, the first switch 131, the second switch 132, and the ground voltage, so that the LED emits light.

As described above, the light-emission controller 130 can be configured to blink the light-emitting unit 120 when a data signal is transmitted and received between the transmission unit 110 and the wireless television, which will be described with reference to FIG. 5.

FIG. 5 is a circuit diagram of the light-emission control unit of FIG. 4 according to another embodiment of the present invention. Referring to FIG. 5, the light-emission control unit for controlling the light-emitting unit 120 can include a first switch 131, a second switch 132, and a third switch 133. The first and second switches 131 and 132 are switched in response to the first control signal ctrl_1 and the second control signal ctrl_2, respectively. Also, the third switch 133 is switched in response to the third control signal ctrl_3 to allow the light-emitting unit to blink when a data signal is transmitted and received between the transmission unit 110 and the wireless television.

That is, when an actual data signal is transmitted and received between the transmission unit 110 and the wireless television, both power of the wireless transmitter 100 and power of the wireless television are turned on, so that both the first switch 131 and the second switch 132 are turned on. Also, during transmission/reception of data, the third control signal ctrl_3 having a high frequency is delivered to the third switch 133 series-connected to the first and second switches 131 and 132. The third switch 133 is switched in response to the third control signal ctrl_3 to allow the light-emitting unit 120 to blink.

The control signal illustrated in FIG. 4 and an operation of the light-emitting unit in response to the control signal will be summarized below.

FIG. 6 is a table illustrating an operating condition of the light-emitting unit illustrated in FIG. 4. The LED provided to the light-emitting unit 120 maintains an off state in one of cases including a case where both a control signal ctrl_1 and a control signal ctrl_2 are low, a case where a control signal ctrl_1 is low and a control signal ctrl_2 is high, and a case where a control signal ctrl_1 is high and a control signal ctrl_2 is low.

Also, in case where power is supplied to the wireless transmitter 100 and a control signal ctrl_1 is high, and simultaneously, power is supplied to the wireless television and a control signal ctrl_2 is also high, then the LED maintains an on-state.

Also, though not shown, when a data signal is transmitted and received between the transmission unit 110 and the wireless television with both controls signals ctrl_1 and ctrl_2 being high and the LED being set to an on-state, an LED 214 can be allowed to blink in response to a control signal ctrl_3.

Accordingly, compared to a related art where the light-emitting unit 120 provided to the wireless transmitter 100 is turned on/off depending on supplying of power, the light-emitting unit 120 is not allowed to emit light when power is not supplied to the wireless television even though power is supplied to the wireless transmitter 100.

Meanwhile, though not shown, LEDs provided to the light-emitting unit 120 can be divided into a power LED and a transmission/reception LED. The transmission/ reception LED can be controlled to an embodiment of the present invention. In this case, when power of the wireless transmitter 100 is turned on but power of the wireless television is turned off and thus a signal transmission/reception loop is not formed, only the power LED of the light-emitting unit 120 is allowed to emit light and the rest transmission/reception LED is turned off. Therefore, power consumption caused by the transmission/reception LED can be reduced, and dazzling of a user due to light-emission at night can be prevented. Also, the user can judge a power state of the wireless transmitter 100 using on/off states of the power LED, and judge whether power of the wireless television is turned on or off depending on the on/off states of the transmission/reception LED.

A method for controlling a wireless television system including a light-emitting unit that is automatically turned off will be described in detail according to an embodiment of the present invention with reference to the accompanying drawings.

FIG. 7 is a flowchart illustrating a method for controlling a wireless television system according to the present invention. Particularly, in controlling the wireless television system, it is assumed that the light-emitting unit provided to a wireless transmitter includes a power LED and a transmission/reception LED. It is assumed that LED control according to an embodiment of the present invention is applied to the transmission/reception LED.

Referring to FIG. 7, when power is supplied to the wireless transmitter in response to a power-on command from a user (S110), a current path is formed via the power LED, so that the power LED is turned on (S120) and begins to emit light.

Meanwhile, with the wireless transmitter turned on, a power supplying state of the wireless television is judged (S130). The judging of the power supplying state of the wireless television can be performed by detecting a loop back flag transmitted to the wireless transmitter from the wireless television.

When power of the wireless television is turned on and thus the loop back flag is transmitted to the wireless transmitter, the transmission/reception LED is controlled to emit light (S140). In controlling the LED to emit light, one or more switches are series-connected to the transmission/reception LED and the switch can be controlled to be turned on as described above. When the switch is turned on, a current path is formed using a drive power source, the transmission/reception LED, the switch, and a ground voltage, so that the transmission/reception LED is controlled to emit light as described above.

On the other hand, when power of the wireless television is turned off, the transmission/reception LED is controlled to be turned off (S150). In this case, the transmission/reception LED can be turned off by controlling the switch connected to the transmission/reception LED to be turned off.

Meanwhile, when both power of the wireless transmitter and power of the wireless television are turned on, whether a data signal is transmitted/received between the wireless transmitter and the wireless television is judged (S360). When an actual data signal is transmitted/received, the transmission/reception LED is controlled to blink in synchronization with the data signal by controlling the switch connected to the transmission/reception LED (S170). Therefore, a user can judge data transmission/reception is swiftly performed by checking the blinking transmission/reception LED.

On the other hand, when data signal transmission/reception is not swiftly performed due to electromagnetic wave interference such as wireless local area network (LAN) for home use, the transmission/reception LED does not blink but keeps blinking. Therefore, a user can recognize a transmission/reception state of a corresponding data signal is poor.

Subsequently, whether a power-off command from a user is input to the wireless transmitter is judged (S180). When the power-off command is input, drive power supplied to the power LED and the transmission/reception LED is cut off.

Consequently, the power LED and the transmission/reception LED are set to an off-state (S190), and the power LED and the transmission/reception LED stop emitting light.

In the above, a wireless transmitter having a transmission/reception light-emitting unit that is automatically turned off, a wireless television system and a controlling method thereof have been descried.

Although the preferred embodiments of the present invention have been disclosed for illustrative purpose, those skilled in the art will appreciate that various modifications, additions and substitutions can be made without departing from the scope and spirit of the invention as defined in the accompanying claims.

For example, though the wireless television system has been described using a preferred embodiment thereof, it would be obvious to those skilled in the art that the present invention can be applied to a television system where the above-described transmitter is wire-connected to the television.

Therefore, the above-described embodiments are exemplary in all aspects and should not be construed in a limited sense.

Industrial Applicability

The present invention can be applied to a television system.

The invention claimed is:

1. A wireless television system comprising:
    a wireless transmitter for relaying a video signal received from the outside;
    a wireless television for receiving the video signal from the wireless transmitter and displaying an image corresponding to the received video signal;
    a light-emitting unit installed in at least one of the wireless transmitter and the wireless television, and displaying one of a power state and a signal transmission/reception state from one of the wireless transmitter and the wireless television; and
    a light-emission control unit for controlling the light-emitting unit to emit light when a data signal is transmitted/received between the wireless transmitter and the wireless television,
    wherein the light-emission control unit comprises:
        a first switch switched when power of the wireless transmitter is turned on;
        a second switch switched when a signal transmission/reception loop is formed between the wireless transmitter and the wireless television; and
        a third switch for allowing the light-emitting unit to blink when a data signal is transmitted/received between the wireless transmitter and the wireless television.

2. The wireless television system according to claim 1, wherein the first to third switches control supplying of drive power to the light-emitting unit and electrically connect to the light-emitting unit installed in the wireless transmitter, and control supplying of drive power to the light-emitting unit.

3. The wireless television system according claim 2, wherein the first to third switches are series-connected to each other such that drive power is supplied to the light-emitting unit only when all of the first to third switches are turned on.

4. The wireless television system according to claim 1, wherein the wireless transmitter outputs a light-emission control signal to the light-emission control unit depending on a power state of the wireless transmitter and/or forming of a signal transmission/reception loop between the wireless transmitter and the wireless television.

5. The wireless television system according to claim 4, wherein the light-emission control signal comprises:
    a first control signal activated when power of the wireless transmitter is turned on; and
    a second control signal activated when both power of the wireless transmitter and power of the wireless television are turned on.

6. The wireless television system according to claim 5, wherein the light-emission control signal further comprises a third control signal for allowing the light-emitting unit to blink when a data signal is transmitted/received between the wireless transmitter and the wireless television.

7. A wireless transmitter for relaying video signals received from the outside, the wireless transmitter comprising:
    a transmission unit for wirelessly transmitting the video signals to a wireless television;
    a light-emitting unit for displaying one of a power state of the wireless transmitter and a signal transmission state of the transmission unit; and
    a light-emission control unit for controlling the light-emitting unit to emit light when a data signal is transmitted/received between the wireless transmitter and the wireless television,
    wherein the light-emission control unit comprises:
        a first switch switched when power of the wireless transmitter is turned on;
        a second switch switched when a signal transmission/reception loop is formed between the wireless transmitter and the wireless television; and
        a third switch for allowing the light-emitting unit to blink when a data signal is transmitted/received between the wireless transmitter and the wireless television.

8. The wireless transmitter according to claim 7, wherein the first to third switches control supplying of drive power to the light-emitting unit.

9. The wireless transmitter according to claim 8, wherein the first to third switches are series-connected to each other such that drive power is supplied to the light-emitting unit only when all of the first to third switches are turned on.

10. The wireless transmitter according to claim 7, further comprising a main control unit for outputting a light-emission control signal to the light-emission control unit depending on a power state of the wireless transmitter and/or forming of a signal transmission/reception loop between the wireless transmitter and the wireless television.

11. The wireless transmitter according to claim 10, wherein the light-emission control signal comprises:
    a first control signal activated when power of the wireless transmitter is turned on; and
    a second control signal activated when both power of the wireless transmitter and power of the wireless television are turned on.

12. The wireless transmitter according to claim 11, wherein the light-emission control signal further comprises a third control signal for allowing the light-emitting unit to blink when a data signal is transmitted/received between the wireless transmitter and the wireless television.

13. A method for controlling a wireless television system, the method comprising:
    providing power to at least one of a wireless transmitter and a wireless television;
    detecting power providing states of the wireless transmitter and the wireless television;
    generating at least one control signal for controlling a light-emitting unit for displaying one of a power state and a signal transmission state of the wireless transmitter depending on the detection results; and
    when a data signal is transmitted/received between the wireless transmitter and the wireless television in response to the control signal, controlling the light-emitting unit to emit light,
    wherein the generating of at least one control signal comprises:
        generating a first control signal activated when power of the wireless transmitter is turned on;
        generating a second control signal activated when both power of the wireless transmitter and power of the wireless television are turned on; and
        a third control signal for allowing the light-emitting unit to blink when a data signal is transmitted/received between the wireless transmitter and the wireless television.

14. The method according to claim 13, wherein the controlling of the light-emitting unit comprises controlling supplying of drive power to the light-emitting unit by controlling a switching part electrically connected to the light-emitting unit in response to the control signal.

15. The method according to claim 14, wherein the controlling of the light-emitting unit further comprises:
   switching a first switch when power of the wireless transmitter is turned on; and
   switching a second switch when a signal transmission/reception loop is formed between the wireless transmitter and the wireless television.

16. The method according to claim 15, wherein the controlling of the light-emitting unit further comprises switching a third switch to allow the light-emitting unit to blink when a data signal is transmitted/received between the wireless transmitter and the wireless television.

17. A wireless television comprising:
   a display unit for receiving an image signal from a wireless transmitter and displaying an image corresponding to the received image signal;
   a light-emitting unit for displaying one of a power state of the display unit and a signal reception state of the display unit; and
   a light-emission control unit for controlling the light-emitting unit to emit light when a data signal is transmitted/received between the wireless transmitter and the wireless television,
   wherein the light-emission control unit comprises:
      a first switch switched when power of the wireless transmitter is turned on;
      a second switch switched when a signal transmission/reception loop is formed between the wireless transmitter and the wireless television; and
      a third switch for allowing the light-emitting unit to blink when a data signal is transmitted/received between the wireless transmitter and the wireless television.

18. The wireless television according to claim 17, wherein the light-emission control unit outputs a power-on signal of the wireless television as a first control signal, and outputs a signal generated by detection of a loop back flag as a second control signal when both power of the wireless transmitter and power of the wireless television are turned on.

19. The wireless television according to claim 18, wherein the light-emission control unit outputs the data signal transmitted and received between the wireless transmitter and the wireless television as a third control signal.

* * * * *